United States Patent
Garston

(10) Patent No.: US 7,128,325 B1
(45) Date of Patent: Oct. 31, 2006

(54) UTILITY STAND

(76) Inventor: Dean S. Garston, 44 Silvermine Rd., Boxford, MA (US) 01921

( * ) Notice: Subject to any disclaimer, the term of this patent is extended or adjusted under 35 U.S.C. 154(b) by 160 days.

(21) Appl. No.: 10/609,909

(22) Filed: Jun. 30, 2003

Related U.S. Application Data

(60) Provisional application No. 60/398,931, filed on Jul. 26, 2002.

(51) Int. Cl.
B62B 1/12 (2006.01)
(52) U.S. Cl. .................. 280/38; 280/652; 280/47.35; 108/120
(58) Field of Classification Search ............... 280/645, 280/651, 652, 47.18, 47.19, 47.33, 47.35, 280/38, 40; 108/118, 119, 120; 248/166, 248/431, 164, 432, 188.6
See application file for complete search history.

(56) References Cited

U.S. PATENT DOCUMENTS

| | | | |
|---|---|---|---|
| 3,552,521 A | 1/1971 | Tate | |
| 3,573,879 A | 4/1971 | Bergkamp | |
| 3,684,055 A | 8/1972 | Rice | |
| 3,857,460 A | 12/1974 | Nini | |
| 4,611,823 A * | 9/1986 | Haas | 280/641 |
| 4,714,224 A * | 12/1987 | Calmes | 248/465 |
| 4,777,976 A * | 10/1988 | Johnston et al. | 137/355.37 |
| 5,002,293 A * | 3/1991 | Gottselig | 280/47.35 |
| 5,029,758 A | 7/1991 | Chayer | |
| 5,046,520 A * | 9/1991 | Sanchez et al. | 137/355.27 |
| D348,550 S | 7/1994 | Cox et al. | |
| 5,456,357 A | 10/1995 | Wenner et al. | |
| 5,758,685 A * | 6/1998 | Tisbo et al. | 137/355.27 |
| 5,927,745 A | 7/1999 | Cunningham | 280/652 |
| 5,988,552 A * | 11/1999 | Tisbo et al. | 242/403.1 |
| 6,176,500 B1 | 1/2001 | Clement, Jr. et al. | |
| 6,497,423 B1 * | 12/2002 | Perelli et al. | 280/47.34 |
| 6,698,771 B1 * | 3/2004 | Bergeron | 280/47.35 |
| 6,827,357 B1 * | 12/2004 | Calmeise et al. | 280/47.34 |

\* cited by examiner

Primary Examiner—Christopher P. Ellis
Assistant Examiner—Jeff Restifo
(74) Attorney, Agent, or Firm—McCormick, Paulding & Huber LLP

(57) ABSTRACT

A utility stand accommodates and/or holds washing implements. The utility stand includes a tray, a hose receptacle and an open frame. The tray is defines at least one recess for accommodating washing implements and other useful items. The open frame includes a base, a first and second support leg and a first and second support assembly. The support legs and the support assemblies are pivotally connected to the tray such that the open frame is collapsible from an upright position for use and a collapsed position for storage.

16 Claims, 3 Drawing Sheets

UTILITY STAND

CROSS REFERENCE TO RELATED APPLICATION

This application claims the benefit of U.S. Provisional Application Ser. No. 60/398,931 filed Jul. 26, 2002 entitled "Car Wash Caddy", the disclosure of which is incorporated by reference herein.

FIELD OF THE INVENTION

The present invention relates to utility stands in general and, more particularly, to collapsible utility stands for organizing and holding various car-washing implements.

BACKGROUND OF THE INVENTION

Washing a car is a labor-intensive act that requires numerous tools. Typically, hoses, soaps, sponges and other common washing implements are utilized when washing a car. Notably, the various tools are not used all at once, but rather are used, for the most part, in a sequential order. For example, a car washer is likely to set down the soap and sponge after applying the soap to the car while he or she rinses the soap off. Placing implements that are not being used on the ground can be troublesome and tends to dirty the implements. The car washer must also often search to find the implements and repeatedly bend down to pick them up. In cases where bending over is physically difficult for the user, such repeated action can become extremely unpleasant, if not impossible. In addition, utility stands are often cumbersome. Because storage space is often at a premium, utility stands are difficult to store because of their weight, lack of mobility and/or considerable footprint.

Therefore, it is desirable to provide a utility stand that overcomes the above-mentioned disadvantages in the prior art.

SUMMARY OF THE INVENTION

According to one aspect of the present invention, a utility stand includes a tray, a hose receptacle and an open frame. The tray defines at least one recess for accommodating washing implements and other useful items at an easily accessible height off of the ground. The open frame includes a base, a first and second support leg and a first and second support assembly. The support legs and the support assemblies are pivotally connected to the tray such that the open frame is collapsible between an upright position for using the utility stand and a collapsed position for storage.

DETAILED DESCRIPTION OF THE PREFERRED EMBODIMENT

Figure 1:
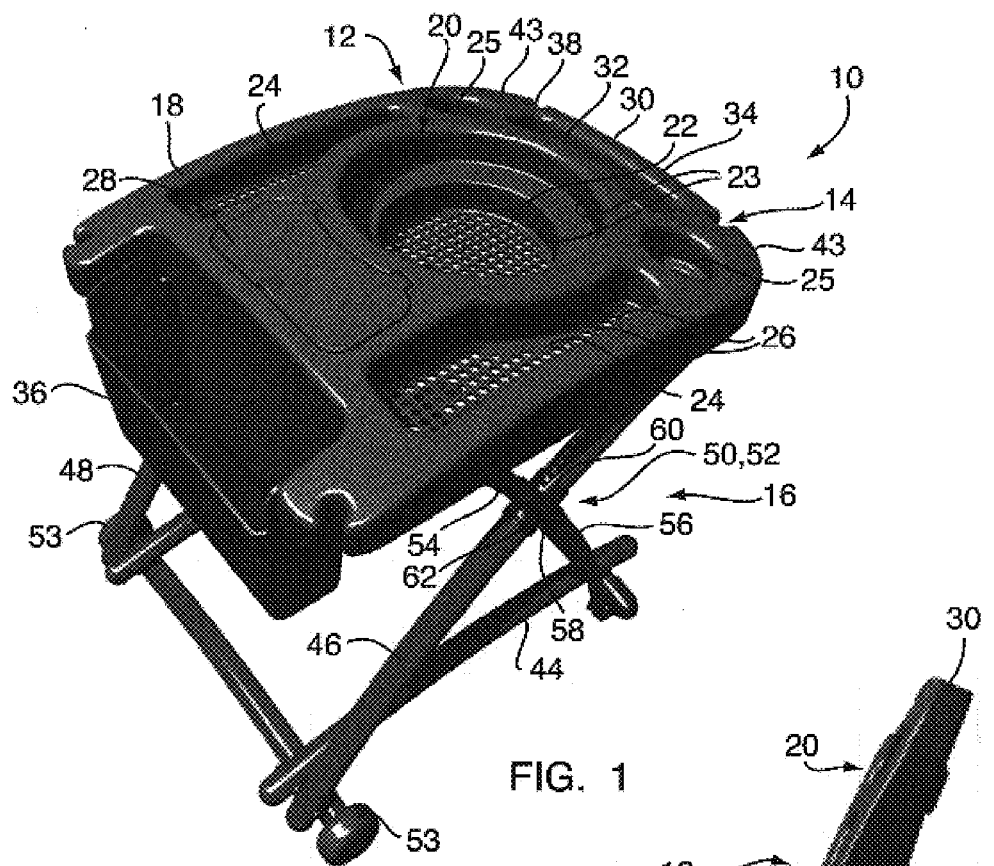
FIG. 1 is a perspective view of one embodiment of the utility stand of the present invention.
Figure 2:
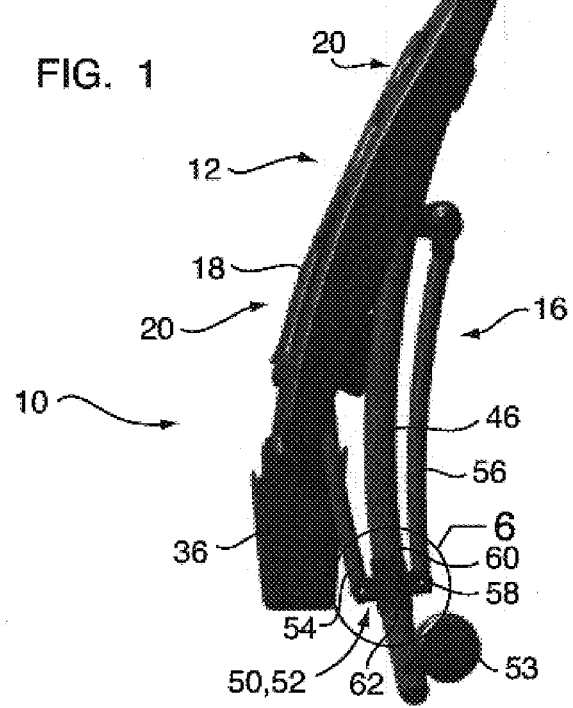
FIG. 2 is a side view of the utility stand of FIG. 1 in a collapsed position.
Figure 4:
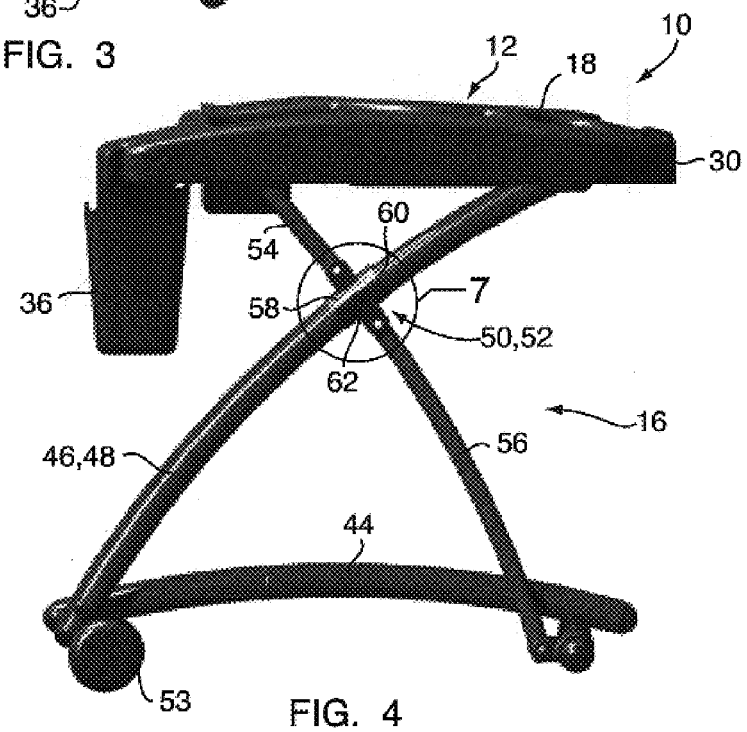
FIG. 4 is a side view of the utility stand in an upright position.
Figure 5:
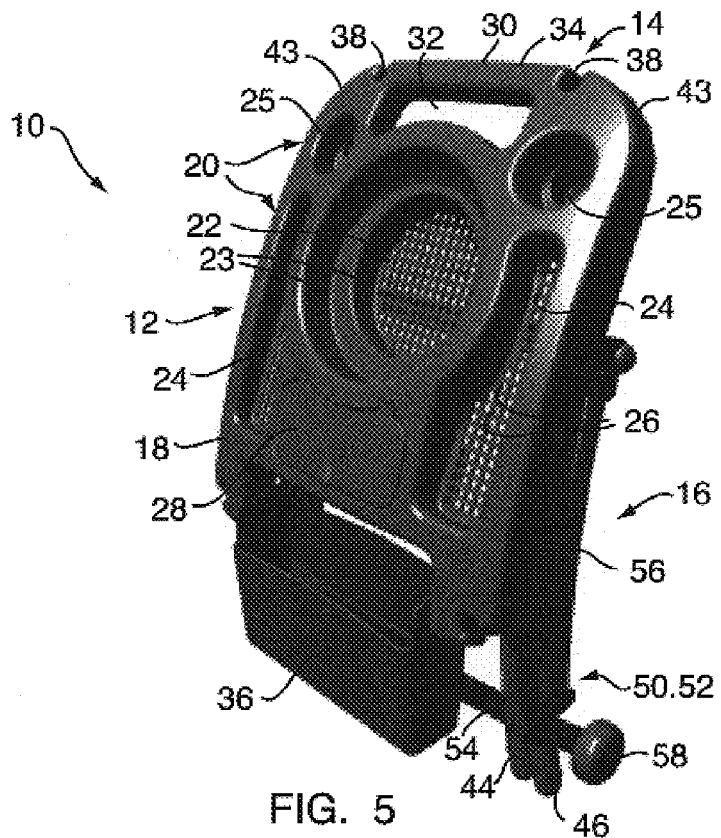
FIG. 5 is a perspective view of the utility stand in a collapsed position.

With reference to FIG. 1, a utility stand embodying the present invention is designated generally by the reference number 10. The utility stand 10 includes a tray 12, a hose receptacle 14, and an open frame 16. The open frame 16 is coupled to the tray 12 such that the utility stand 10 is collapsible between an upright position (as best shown in FIGS. 1 and 4) and a collapsed position (as best shown in FIGS. 2 and 5).

Figure 3:
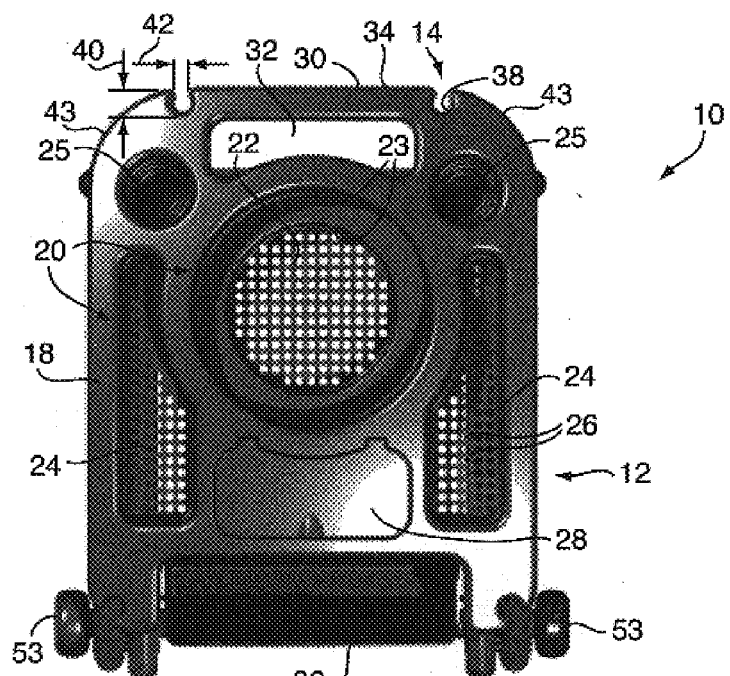
FIG. 3 is a top view of a tray of the utility stand.

Referring to FIG. 3, the tray 12 provides a surface 18 on which washing implements, such as car washing implements, may be placed and/or held in a raised location relative to the ground. Typical car washing implements include, for example, soaps, sponges, chamois, and buckets. This list, however, is not to be considered to be exhaustive of all washing implements known to those skilled in the art. The tray 12 may be made of any durable material and preferably includes a lightweight and substantially rigid material such as, for example, a polymeric material.

The surface 18 of the tray 12 defines at least one recess 20. The at least one recess 20 is typically sized and shaped to accommodate one or more of the aforementioned washing implements or other useful items. As shown in FIG. 3, for example, the tray 12 defines a substantially circular recess 22 having a diameter suitable for accommodating a bucket. Typically, buckets used for washing cars range in capacity from two (2) gallons to five (5) gallons. As shown in FIGS. 1 and 3, the circular recess 22 is bounded peripherally by a plurality of stepped side walls 23 of various diameters, thereby enabling the recess 22 to effectively accommodate buckets of various diameters.

The tray 12 preferably defines at least one elongated recess 24 sized for accommodating sponges and other similarly shaped or sized items. FIG. 3, for example, shows a tray 12 defining two (2) elongated recesses 24 positioned on either side of the circular recess 22. As shown in FIG. 3, the tray can also define a recess 20 sized for accommodating a beverage container 25, such as twelve (12) oz. aluminum cans or glasses.

Preferably, the tray 12 also defines at least one hole 26 in the surface of the at least one recess 20. The hole(s) 26 provide drainage for the tray 12 to prevent any spilled substances, such as soap or water, from collecting in one or more recess 20 and possibly spilling over the surface 18. Typically, the holes 26 are sized to be large enough to allow the spilled substances to easily flow therethrough, but small enough to prevent the washing implements and other useful items from falling therethrough. Some of the recesses 20 can be covered with a removable lid 28. The removable lid 28 shown, for example, in FIG. 3 adjacent to the circular recess 22 and between the two elongated recesses 24 described above, is hingedly attached to the tray 12 and substantially covers the recess 20. However, the removable lid 28 can simply lie over the recesses 20 of the tray 12, or be coupled to the tray in other ways without departing from the scope of the present invention.

Referring back to FIG. 1, the tray 12 also can include a handle 30. The handle 30 allows for moving, carrying and/or hanging the tray 12. The handle 30 is formed in the tray and includes an elongated aperture 32. The aperture 32 is located near a side 34 of the tray 12 at a distance that allows the user to easily grasp the handle 30 by placing his or her fingers through the aperture 32. Although the handle 30 is shown as being formed directly in the tray 12, the handle 30, in other embodiments, is affixed to the tray 12 and/or the open frame 16 to enable to the utility stand 10 to be moved, carried and/or hung.

Referring to FIGS. 1 and 2, the utility stand 10 can further comprise a container 36 coupled to the tray 12. More specifically, the container 36 is coupled to one side of the tray 12 and extends below the surface 18 of the tray 12. The container 36 can be of any practical size, but is preferably rectangular and sized to accommodate several washing implements or other useful items, such as spray bottles. Preferably, as shown in FIG. 2, the container 36 is pivotally attached to the tray 12 in order to allow the container 36 to pivot out of the way of the open frame 16 when in the collapsed position. The container 36 can be made of any durable material and preferably includes a lightweight and substantially rigid material such as, for example, a polymeric material.

Referring now to FIG. 3, the hose receptacle 14 is defined by the tray 12 and is sized to hold a water hose. A typical water hose is made of a rubber, or similar natural or synthetic flexible material, and typically has an outer diameter of approximately 0.75 inches to 1.5 inches. However, the hose receptacle can be sized to accommodate hoses of smaller or larger outer diameters, as well. As shown in FIG. 3, the hose receptacle 14 can be a slot 38 formed in the tray having a length 40 and a width 42. Preferably, the length 40 and width 42 are sized to hold the water hose in place by slightly pinching the sides of the flexible water hose when the water hose is placed in the slot 38. As shown in FIG. 3, the tray 12 preferably includes hose receptacles 14 located substantially near each corner 44 of the tray 12. The length and width of the various slots defined by the tray 12 may vary to accommodate various sizes of water hoses.

Referring now to FIGS. 1 and 4, the open frame 16 includes a base 44, a first support leg 46, a second support leg 48, a first support assembly 50 and a second support assembly 52. The base 44 provides a substantially rigid support to which the support legs 46,48 and support assemblies 50,52 are coupled. The base 44 may be of any practical shape and size, and preferably is shaped substantially similarly to the shape of the tray 12. The base 44 can be fabricated of any suitable durable material such as, for example, PVC and aluminum pipe. At least two wheels 53 are connected to the base 44 to enable the utility stand 10 to be moved while lifting by the handle 30 one end of the utility stand 10.

The first and second support legs 46,48 are substantially unitary supports that are pivotally coupled to opposite sides of the base 44 and the tray 12 relative to each other. As shown in FIG. 3, the support legs 46,48 extend diagonally from the tray to the base when the utility stand 10 is in the upright position. The support legs 46,48 may be of any suitable length and are preferably a length that positions the tray 12, when in the upright position, at a height easily reachable by the user. PVC and aluminum pipe are suitable materials for constructing the support legs.

Figure 6:
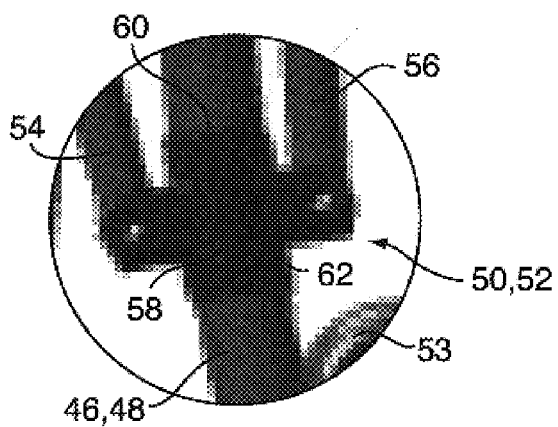
FIG. 6 is an enlarged view of area "6" of FIG. 2 showing a sleeve of the utility stand in the upright position.
Figure 7:
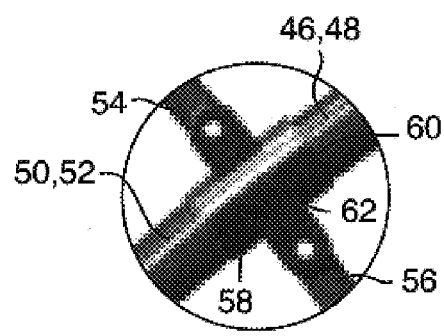
FIG. 7 is an enlarged view of area "7" of FIG. 4 showing the sleeve of the utility stand in the collapsed position.

The support assemblies 50,52 each include an upper segment 54, a lower segment 56 and a sleeve 58. Each sleeve 58 defines an aperture 60 and has an outer surface 62. The aperture 60 is preferably sized and shaped to accommodate the support legs 46,48. As shown in the figures, the support legs 46,48 and the aperture 60 of the sleeve 58 are substantially circular. As shown in FIGS. 6 and 7, the outer surface 62 of each sleeve 58 is pivotally connected to both the upper and lower segments 54,56 of the associated support assemblies 50,52 to enable the utility stand 10 to be folded into a collapsed position. The upper segments 54 are pivotally coupled to the tray 12 and the lower segments 56 are pivotally coupled to the base 44. As shown in FIGS. 1 and 4, the first and second support assemblies 50,52 are coupled to the tray 12 and the base 44 on the same side as the first and second support legs 46,48, respectively. The first and second support assemblies 50,52 are coupled to the base 44 and the tray 12 such that they extend diagonally from the tray 12 to the base 44 when in the upright position and intersect with the support legs 46,48. At the intersection between the support assemblies 50,52 and the support legs 46,48, the sleeves 58 are positioned around and encompass the associated support leg 46,48. The sleeves 58 are slidable along at least a segment of the support legs 46,48.

The upper and lower segments 54,56 of the support assemblies 50,52 are sized to position the tray parallel to the ground when the utility stand 10 is in the upright position. PVC and aluminum pipes are suitable materials for constructing the upper and lower segments 54,56 of the support assemblies 50,52.

In operation, as shown in FIG. 1, the open frame is positioned in the upright position to provide support for, and position the tray 12 at a convenient height relative to the ground for the user. The user may selectively place various washing implements and/or beverages in the recesses 20 and easily retrieve when needed. In addition, the user may selectively place a hose in any one of the hose receptacles 14 when the hose is not in use. When the utility stand 10 is not in use, the user may collapse the open frame 16 by sliding the sleeves 58 of the support assemblies 50,52 along the support legs 46,48 from the upright position to the collapsed position, as shown in FIGS. 6 and 7. As the sleeves 58 slide along the support legs 46,48, the upper and lower segments 54,56 of the support assemblies 50,52 pivot in relation to the sleeves 58, causing the open frame 16 to collapse and the base 44 to move toward and close to the tray 12. The container 36 also pivots to allow the utility stand 10 to fold substantially flat, as shown in FIGS. 2 and 5. The collapsed utility stand 10 may then be compactly lifted and carried away and/or hung by the handle 30.

While the present invention has been illustrated and described with respect to a particular embodiment thereof, those of ordinary skill in the art should appreciate that various modifications to this invention may be made without departing from the spirit and scope of the present invention.

What is claimed is:

1. A utility stand, comprising:

an open frame including a base, a first support leg, a second support leg, a first support assembly and a second support assembly, wherein the first and second support legs and the first and second support assemblies are coupled to the base such that the open frame is collapsible between an upright position and a folded position;

a tray positioned on the open frame and defining at least one recess for accommodating washing implements;

at least one hose receptacle associated with the open frame for holding hose;

the first and second support legs being pivotally coupled to the tray and the base, and extending diagonally from the base to the tray when the utility stand is in the upright position;

the first and second support assemblies each including an upper segment, a lower segment and a sleeve defining an outer surface and an aperture, the upper and lower segments being pivotally coupled to the outer surface of the sleeve, the upper segment being pivotally coupled to the tray and the lower segment being pivotally coupled to the base;

the first and second support assemblies each extending diagonally from the base to the tray when the utility stand is in the upright position and intersecting with the first and second support legs, respectively; and the apertures defined by the sleeves of the first and second support assemblies being positioned around the first and second legs, respectively, at the intersection between the support legs and the support assemblies so that the sleeves are slidable along at least a portion of the first and second legs.

2. The utility stand of claim 1, wherein the open frame includes aluminum tubing.

3. The utility stand of claim 1, wherein the open frame includes PVC tubing.

4. The utility stand of claim 1 further comprising at least two wheels affixed to the base of the open frame.

5. The utility stand of claim 1, wherein the tray and the base are each generally rectangular in shape.

6. The utility stand of claim 5, wherein the tray includes a polymeric material.

7. The utility stand of claim 6, wherein the hose receptacle includes at least one slot defined by the tray, the slot being located near at least one corner of the rectangular tray.

8. The utility stand of claim 7, wherein the at least one slot includes a plurality of slots located substantially near all of the corners of the rectangular tray.

9. The utility stand of claim 1, wherein the tray defines at least one hole located in the at least one recess for drainage.

10. The utility stand of claim 1, wherein the at least one recess is sized to accommodate a beverage container.

11. The utility stand of claim 1, wherein the at least one recess is substantially circular and sized to accommodate a bucket.

12. The utility stand of claim 1 further comprising a removable lid that substantially covers the at least one recess.

13. The utility stand of claim 1 further comprising a container connected to a side of the tray.

14. The utility stand of claim 13, wherein the container is pivotally attached to a side of the tray to allow the utility stand to collapse into a folded position.

15. The utility stand of claim 1, wherein the tray further includes a handle.

16. The utility stand of claim 1, wherein the handle is defined by the tray.

* * * * *